US011987306B2

(12) United States Patent
Subramanian et al.

(10) Patent No.: US 11,987,306 B2
(45) Date of Patent: May 21, 2024

(54) MODULAR VEHICLE ARCHITECTURE ENABLING RANGE ON DEMAND

(71) Applicants: MAGNA INTERNATIONAL INC., Aurora (CA); Azhagu Subramanian, Troy, MI (US); Rahul Meka, Rochester Hills, MI (US); Joel Stiverson, St. Clair Shores, MI (US); Gianfranco Gabbianelli, Birmingham, MI (US)

(72) Inventors: Azhagu Subramanian, Troy, MI (US); Rahul Meka, Rochester Hills, MI (US); Joel Stiverson, St. Clair Shores, MI (US); Gianfranco Gabbianelli, Birmingham, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 240 days.

(21) Appl. No.: 17/293,935

(22) PCT Filed: Nov. 14, 2019

(86) PCT No.: PCT/US2019/061373
§ 371 (c)(1),
(2) Date: May 14, 2021

(87) PCT Pub. No.: WO2020/102478
PCT Pub. Date: May 22, 2020

(65) Prior Publication Data
US 2022/0119054 A1    Apr. 21, 2022

Related U.S. Application Data

(60) Provisional application No. 62/767,305, filed on Nov. 14, 2018.

(51) Int. Cl.
*B62D 63/02* (2006.01)
*B60K 5/00* (2006.01)
(Continued)

(52) U.S. Cl.
CPC .............. *B62D 63/025* (2013.01); *B60K 5/00* (2013.01); *B60L 50/64* (2019.02); *B60S 9/02* (2013.01)

(58) Field of Classification Search
CPC ......... B62D 63/025; B60L 50/64; B60K 5/00; B60S 9/02
See application file for complete search history.

(56) References Cited

U.S. PATENT DOCUMENTS 3,062,309 A    11/1962  Schwartz
4,881,756 A *  11/1989  Kumasaka ............. B62D 65/04
                                              296/193.03
(Continued)

FOREIGN PATENT DOCUMENTS

DE          4230529 A1 *  3/1994
DE          4230529 A1 *  3/1994    ............... B60K 1/04
(Continued)

*Primary Examiner* — James A Shriver, II
*Assistant Examiner* — Nicholas R. Kandas
(74) *Attorney, Agent, or Firm* — Dickinson Wright PLLC

(57) ABSTRACT

A system for modifying the range capability of an electric vehicle includes a vehicle body having a front axle and a rear module secured to the vehicle body. The rear module includes a rear axle and the rear module is detachable from the vehicle body and replaceable with another rear module. The rear modules may include different range extension capabilities. The rear modules may include a battery or a combustion engine that may supplement the standard battery and electric motor of the vehicle. A pair of laterally translatable pins of the rear module may be moveable into and out of engagement with the vehicle body. The rear module may also include vertically extending posts that engage with the vehicle body. The vehicle body may be raised to disengage the posts from the vehicle body.

19 Claims, 12 Drawing Sheets

(51) Int. Cl.
  *B60L 50/64* (2019.01)
  *B60S 9/02* (2006.01)

(56) References Cited

U.S. PATENT DOCUMENTS

| | | |
|---|---|---|
| 2006/0065451 A1 | 3/2006 | Morrow et al. |
| 2012/0217080 A1 | 8/2012 | Besler et al. |
| 2016/0083012 A1 | 3/2016 | Stenzenberger et al. |

FOREIGN PATENT DOCUMENTS

| | | | | |
|---|---|---|---|---|
| DE | 4230529 C2 | | 4/2002 | |
| DE | 102010014095 A1 | | 10/2011 | |
| ES | 2293886 T3 | * | 1/2000 | |
| ES | 2293886 T3 | * | 4/2008 | ............... B60G 3/06 |
| FR | 2684347 A1 | * | 6/1993 | |
| FR | 2684347 A1 | * | 6/1993 | ............ B60J 1/1884 |
| KR | 101372374 B1 | * | 3/2014 | |
| WO | 2017168399 A1 | | 10/2017 | |
| WO | WO 2017168399 A1 | * | 10/2017 | |
| WO | WO-2017168399 A1 | * | 10/2017 | ............... B60K 1/04 |

* cited by examiner

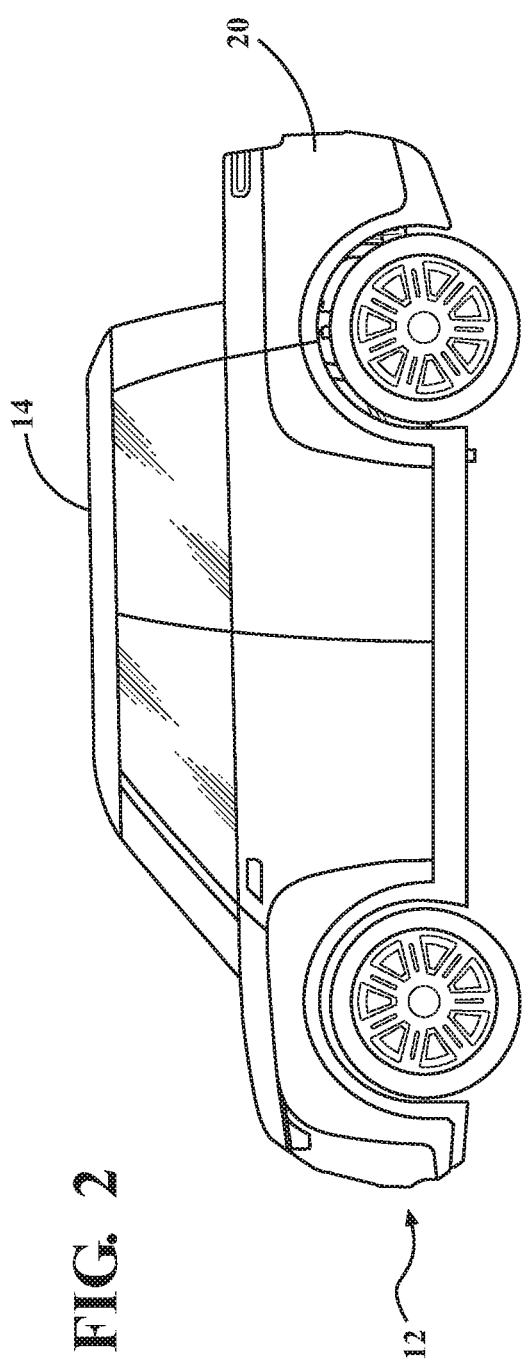
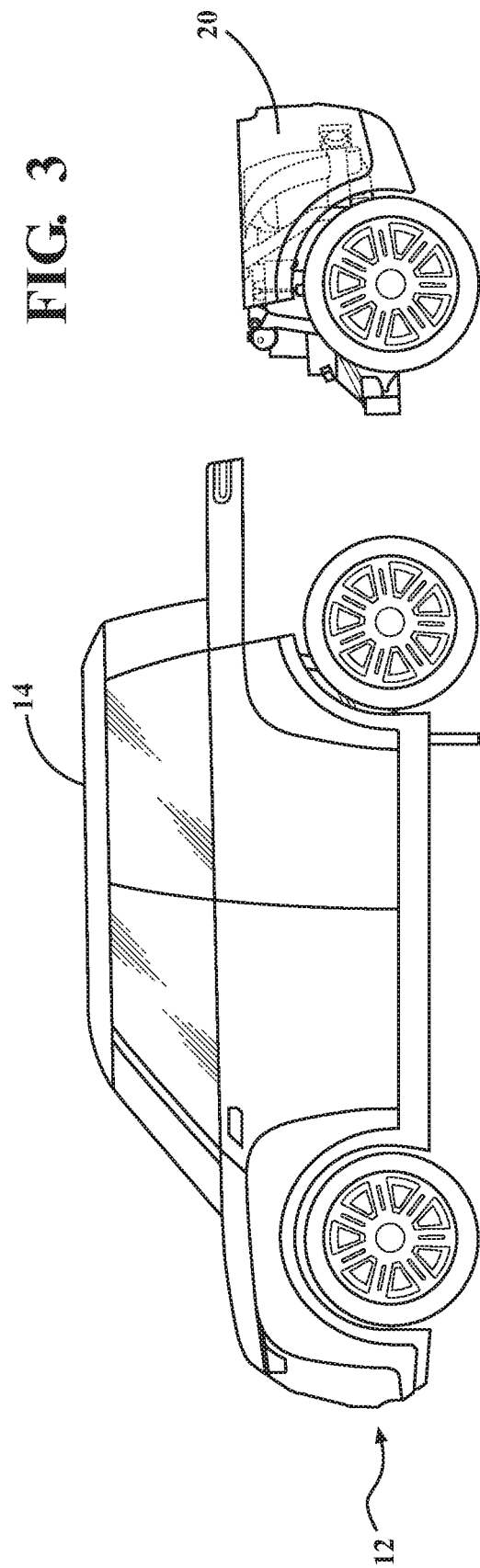

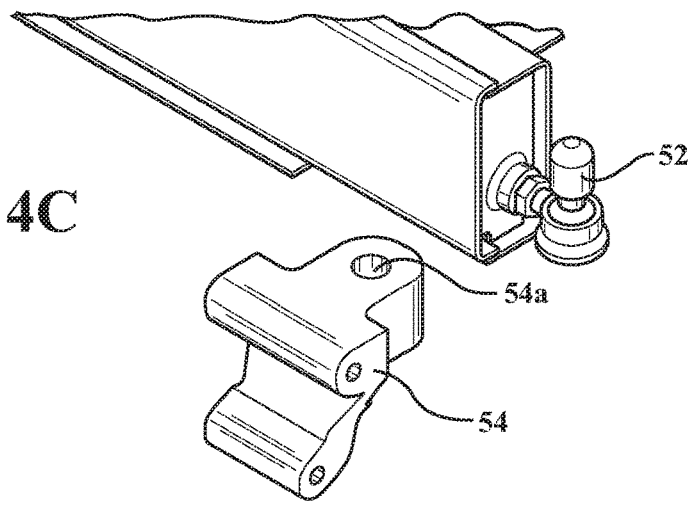
FIG. 4C
FIG. 4D
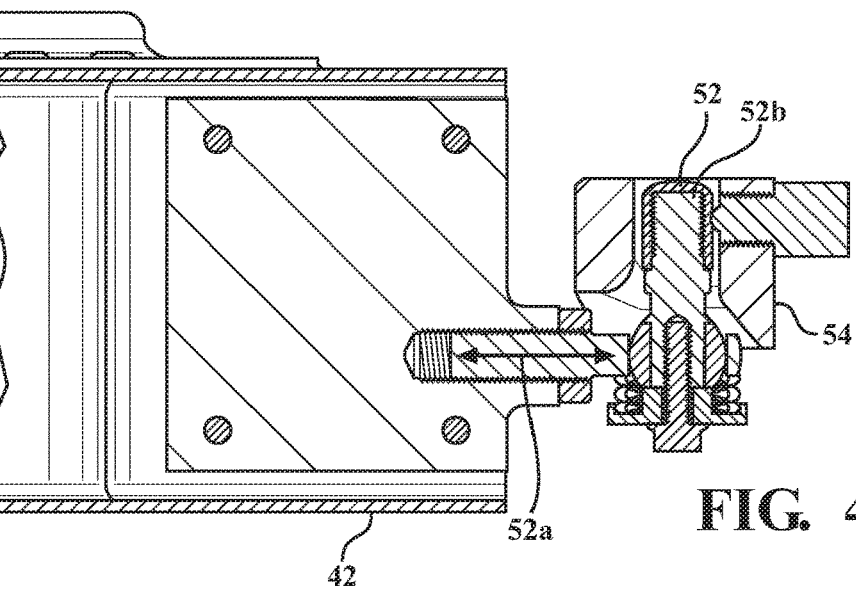
FIG. 4E

MODULAR VEHICLE ARCHITECTURE ENABLING RANGE ON DEMAND

CROSS-REFERENCE TO RELATED APPLICATIONS

This U.S. National Stage Patent Application claims the benefit of PCT International Patent Application Serial No. PCT/US2019/061373 filed Nov. 14, 2019 entitled "MODULAR VEHICLE ARCHITECTURE ENABLING RANGE ON DEMAND" which claims the benefit of and priority to U.S. Provisional Patent Application Ser. No. 62/767,305 filed on Nov. 14, 2018, titled "Modular Vehicle Architecture Enabling Range On Demand," the entire disclosure of which is hereby incorporated by reference.

TECHNICAL FIELD

The present disclosure relates to passenger vehicle architecture. More particularly, the present disclosure relates to modular passenger vehicle architecture for use in electric vehicles.

BACKGROUND OF THE DISCLOSURE

Passenger vehicles, and in particular electric vehicles, allow the vehicle to travel a certain distance before requiring that vehicle be re-charged or re-fueled. Traditional passenger vehicles with a gas-powered internal combustion engine are limited in range by the efficiency of the combustion engine and the amount of fuel that the vehicle can hold. Electric vehicles with a battery-operated electric motor are limited in range by the efficiency of the motor and the charging capacity of the battery that powers the electric motor.

Some vehicles, such as hybrid vehicles, include both an internal combustion engine and a battery powered electric motor, allowing for additional range or improved efficiency relative to solely battery powered vehicle or a solely gas powered vehicle. Some hybrid and electric vehicles include regenerative braking, where the electric motor acts as a generator during braking events, which can charge the battery, improving the range of the vehicle.

A battery-operated vehicle (BEV) is the designation typically used for a vehicle without an internal combustion engine component. Battery operated vehicles rely solely on the capacity of the battery to determine the range of the vehicle. Battery operated vehicles may be charged by a traditional consumer wall outlet or a higher voltage outlet specifically designed for charging the vehicle. Various battery-operated vehicles can have different range capacities based on the size of the battery for a given vehicle.

Another type of electric vehicle is a plug-in hybrid vehicle (PHEV). A plug in hybrid vehicle includes both a battery and an internal combustion engine and, similar to a BEV, the plug in hybrid may be charged by plugging in the vehicle to outlet or other charging source external to the vehicle.

One of the advantages of an electric vehicle is the ability to operate the vehicle with little to no gas consumption, which can save the vehicle owner money that is otherwise spent on gasoline. However, the ability to charge the electric vehicle, such as by plugging-in the vehicle to charge it, is more limited relative to the ability to re-fuel a traditional vehicle. Accordingly, the range of the vehicle without access to a charging station can limit the usefulness of the electric vehicle, in particular for longer trips. This can also lead to range anxiety.

The range of the vehicle is typically fixed at the time of manufacture, with some vehicles having larger batteries or more batteries installed at the time of the manufacture, leading to a vehicle with greater range, and greater permanent cost. It becomes a consumer choice whether to spend more for a vehicle with a greater range. In many cases, the typical day-to-day use of a vehicle may be limited to a small range, making a smaller battery a more economical choice. However, there may be times where the vehicle owner requires a larger range than what the vehicle can provide.

One solution to the need for additional range relative to a given electric vehicle is the use of a range extender trailer. This type of range extender is in the form of a generator that is connected to the vehicle and towed behind the vehicle, similar to a cargo trailer, giving the vehicle additional range relative to the existing vehicle range. This type of trailer can be retrofitted to existing vehicles, but it also has its drawbacks. For one, the trailer may not meet safety standards depending on the environment in which it is used. For another, the trailer takes up a considerable amount of space behind the vehicle, and requires the vehicle operator to be familiar with operating a trailer behind the vehicle.

In view of the above, improvements can be made for increasing the range of electric vehicles.

SUMMARY OF THE INVENTION

In one aspect, a system for modifying the range capabilities of an electric vehicle is provided. The system includes a vehicle body having a vehicle structure and a first axle, wherein the first axle is one of a front axle or a rear axle; a first removable module having a second axle, wherein the second axle is the other of the front axle or the rear axle, the first removable module detachably coupled to the vehicle structure, wherein the first removable module and the vehicle structure are attached at a plurality of attachment points; an electrical connector disposed at an interface between the vehicle body and the first removable module for electrically connecting the vehicle body to the first removable module.

The first removable module is removable from the vehicle structure when the first removable module is disengaged from the vehicle structure at the attachment points and the electrical connector is disengaged, and the first removable module is replaceable with a second removable module having range extending systems that differ from the first removable module.

In one aspect, there are no hydraulic or other fluid connections between the vehicle body and the first removable module, and there are no cable connections between the vehicle body and the first removable module other than the electrical connector.

In one aspect, the plurality of attachment points includes a pair of upper attachment points and a pair of lower attachment points configured to enable connection of second rear modules having a wide dimensional tolerance at the attachment points.

In one aspect, each of the lower attachment points is defined by a ball joint linkage with a vertical post of the first removable module received in a bore of a block member of the vehicle body.

In one aspect, each of the upper attachment points is defined by a retractable pin of the first removable module received in a bore of a bracket of the vehicle body.

In one aspect, the pin is moveable laterally inward and outward relative to a support frame of the first removable module between an engaged position in which the pin is received within the bracket and a disengaged position in which the pin is not received within the bracket.

In one aspect, the pin is moveable via an actuation mechanism having a brain plate mechanism coupled to the pins, wherein rotation of the brain plate mechanism in a first direction moves the pins toward the disengaged position, and rotation of the brain plate mechanism in a second direction moves the pins toward the engaged position, wherein the pins are biased toward the engaged position, wherein movement of the pins toward the disengaged position includes compressing and loading a spring member and moving the pin upon de-compression of the spring when the brain plate is rotated.

In one aspect, the pins retain the first removable module relative to the vehicle body at least in a fore-and-aft direction and a vertical direction, and the posts retain the first removable module relative to the vehicle body at least in a lateral direction and fore-and-aft direction.

In one aspect, when the pins are in the disengaged position, the vehicle body is moveable vertically relative to the first removable module to a disengaged state at each of the plurality of attachment points and the first removable module is moveable in the fore-and-aft direction away from the vehicle body.

In one aspect, the vehicle body includes a jack mechanism configured to extend downward into engagement with a physical surface disposed below the vehicle body, wherein extension of the jack mechanism moves the vehicle body upward to disengage the vehicle body from the posts of the first removable module when the pins of the first removable module are disengaged.

In one aspect, the second removable module includes a combustion engine configured to provide range extension capabilities relative to the first removable module.

In one aspect, the second removable module includes a battery having a greater range capability than the first removable module.

In another aspect, a method for modifying a range capability of an electric vehicle is provided. The method includes providing a vehicle body having a vehicle structure and a first axle; providing a first removable module having a second axle, wherein the first removable module is secured to the vehicle structure at a plurality of attachment points and detachable from the vehicle structure; providing an electrical connection between the vehicle structure and the removable module via an electrical connector; detaching the first removable module from the vehicle structure at each of the attachment points; disengaging the electrical connection between the vehicle structure and the first removable module; removing the first removable module from the vehicle structure; and replacing the first removable module with a second removable module, wherein the second removable module includes range extending components that differ from the first removable module.

In one aspect, there are no hydraulic or other fluid connections between the vehicle body and the removable module, and there are no cable connections between the vehicle body and the removable module other than the electrical connector.

In one aspect, the method further includes disengaging a pair of pins from the vehicle structure, wherein the pins are coupled to the first removable module and extend laterally into a bore of a bracket of the vehicle structure in an engaged position and move laterally inward to a disengaged position; disengaging a pair of ball joint linkages with vertical posts from the vehicle structure, wherein the ball joint linkages with vertical posts are coupled to the first removable module and extend vertically into a bore of a block member of the vehicle structure, wherein the ball joint linkages with vertical posts are disengaged by raising the vehicle structure relative to the removable module when the pins are disengaged; disposing the second removable module below the vehicle structure when the vehicle structure is raised; lowering the vehicle structure onto the second removable module, wherein posts of the second removable module are received in the block member of the vehicle structure; inserting a pair of pins of the second removable module into the bores of the bracket of the vehicle structure; and engaging the electrical connection between the vehicle structure and the second removable module.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 illustrates the vehicle with the rear module installed;

FIG. 3 illustrates the vehicle with the rear module detached from the vehicle and a further rear module being presented to the vehicle body for installation;

FIGS. 4A-4G illustrates a support frame of the rear module and associated connection types for attaching the rear module to the vehicle body, including lower connection points including posts and upper connection points including pins, and an actuation mechanism for controlling the pins;

DESCRIPTION OF THE ENABLING EMBODIMENT

Referring to the Figures, an on demand electric vehicle range extending system 10 is provided. The system 10 is configured to allow for modular replacement of a portion of a vehicle 12 to increase the range capacity of the vehicle 12 as desired by the vehicle operator.

Figure 1:
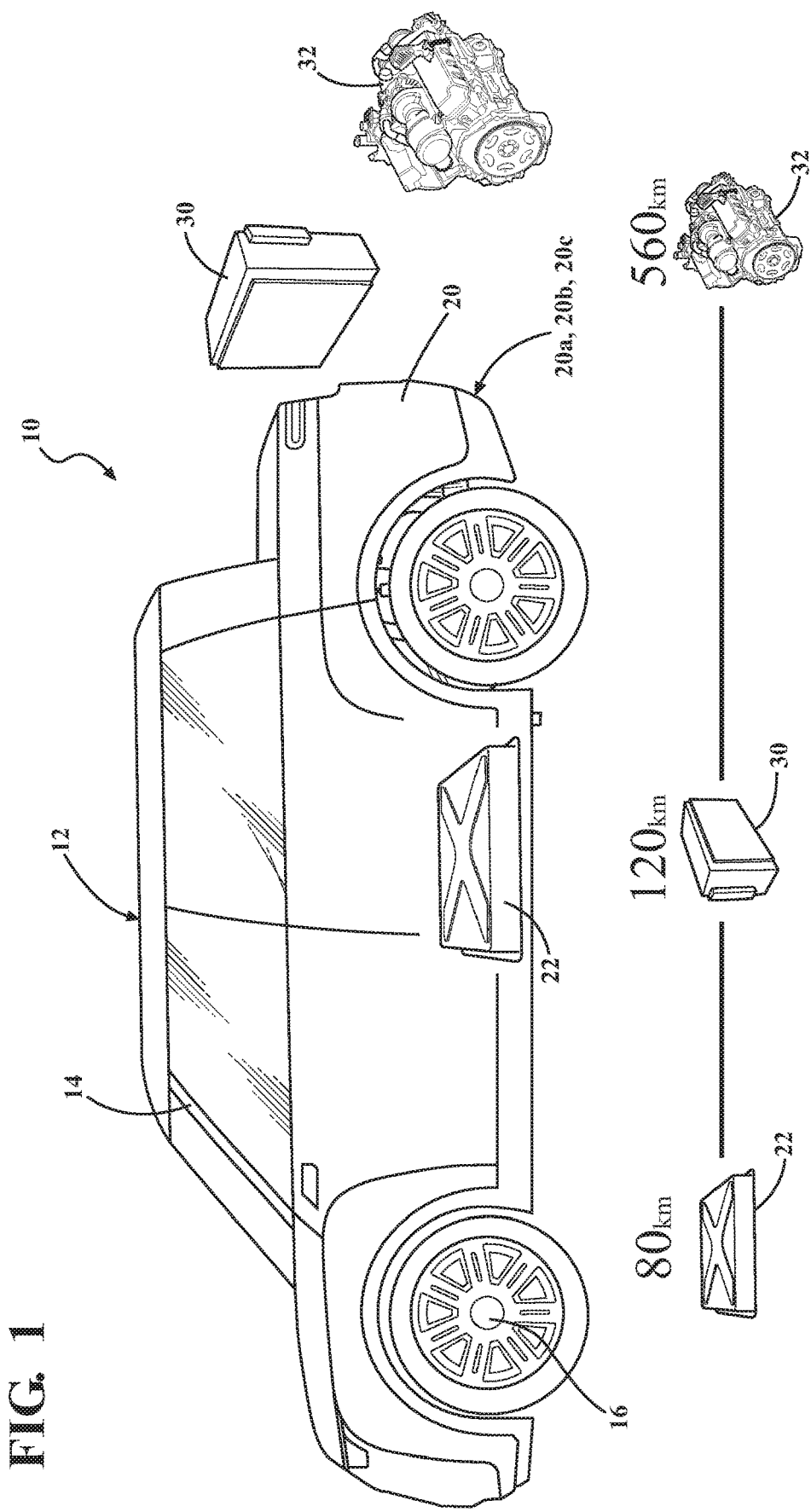
FIG. 1 illustrates an electric vehicle having a vehicle body and rear module attached to the vehicle body, and further illustrates various components that can be installed within the rear module.

With reference to FIG. 1, the system 10 may include the vehicle 12, which includes a vehicle body 14, a primary axle 16 (which may the front axle of the vehicle 12), and a secondary axle 18 (which may be the rear axle of the vehicle 12).

The secondary axle 18 may be included in a rear module 20, which may also be referred to an extension module. The rear module 20 is configured to be removable and replaceable from the vehicle body 14 depending on the range needs of the user. The rear module 20 may have different forms, providing various ranges of range extending benefits.

In one form, the rear module 20 may be a nominal rear module 20a, in which no additional range extension capabilities are included. The nominal form of the rear module 20 may be the module that is provided initially with the vehicle, such that the vehicle 12 may have a nominal electric range based on the factory installed battery and primary electric motor. When installed to the vehicle body 14, the rear module 20 may provide power and communicate with various components of the vehicle via one or more electrical connections, which can be disconnected when the rear module 20 is removed from the vehicle body 14.

For purposes of discussion herein, the rear module 20 will be described as located at the rear of the vehicle 12 and includes the rear axle 18. However, it will be appreciated that the module 20 may be located at different locations, such as the front of the vehicle 12 and include the front axle.

One type of arrangement for the vehicle 12 includes the vehicle body 14, having the front axle 16, and the nominal rear module 20a including the rear axle 18. The vehicle 12 may be in the form of a battery electric vehicle (BEV), in which the front axle 16 is driven by a PSM electric motor, where all of the vehicle power comes from the battery, and there is no additional combustion engine for providing additional power to the vehicle 12. The BEV form of the vehicle 12 is typically highly efficient, and the PSM e-motor is effectively in constant operation. The vehicle 12 may include a standard battery module 22 having a given capacity and power, and a typical range dependent on the charging capacity of the vehicle.

The nominal rear module 20a, including the rear axle 18, is detachably attached to the vehicle body 14 at the rear end of the vehicle body 14. The vehicle body 14 includes structure extending to the rear of the vehicle 12, where the structure terminates at its interface with the rear module 20. Accordingly, the vehicle body 14 may define a cavity or opening or the like in which the rear module 20 is disposed. The rear module 20 is attachable to the vehicle body 14 to define the overall arrangement and shape of the vehicle 12, thereby defining the vehicle 12 to include both the front axle 16 and the rear axle 18 when assembled. It will be appreciated that various shapes of the vehicle 12 and the rear module may be used in which the rear module 20 may be attached and detached from the vehicle body 14.

In another approach, the vehicle 12 may be in the form of a serial hybrid or series hybrid vehicle, in which the vehicle 12 is primarily driven by a PSM e-motor, similar to the BEV described above, but with the e-motor being chargeable by a gas-powered generator. In this form, the front axle 16 is not driven by a traditional internal combustion engine and transmission. Rather, the front axle 16 is driven by the e-motor, which is highly efficient. The e-motor is therefore effectively in constant operation. The vehicle 12 in this arrangement may still include the rear module 20 in the nominal form, where the nominal rear module 20a does not include any additional power components.

Figure 4A:
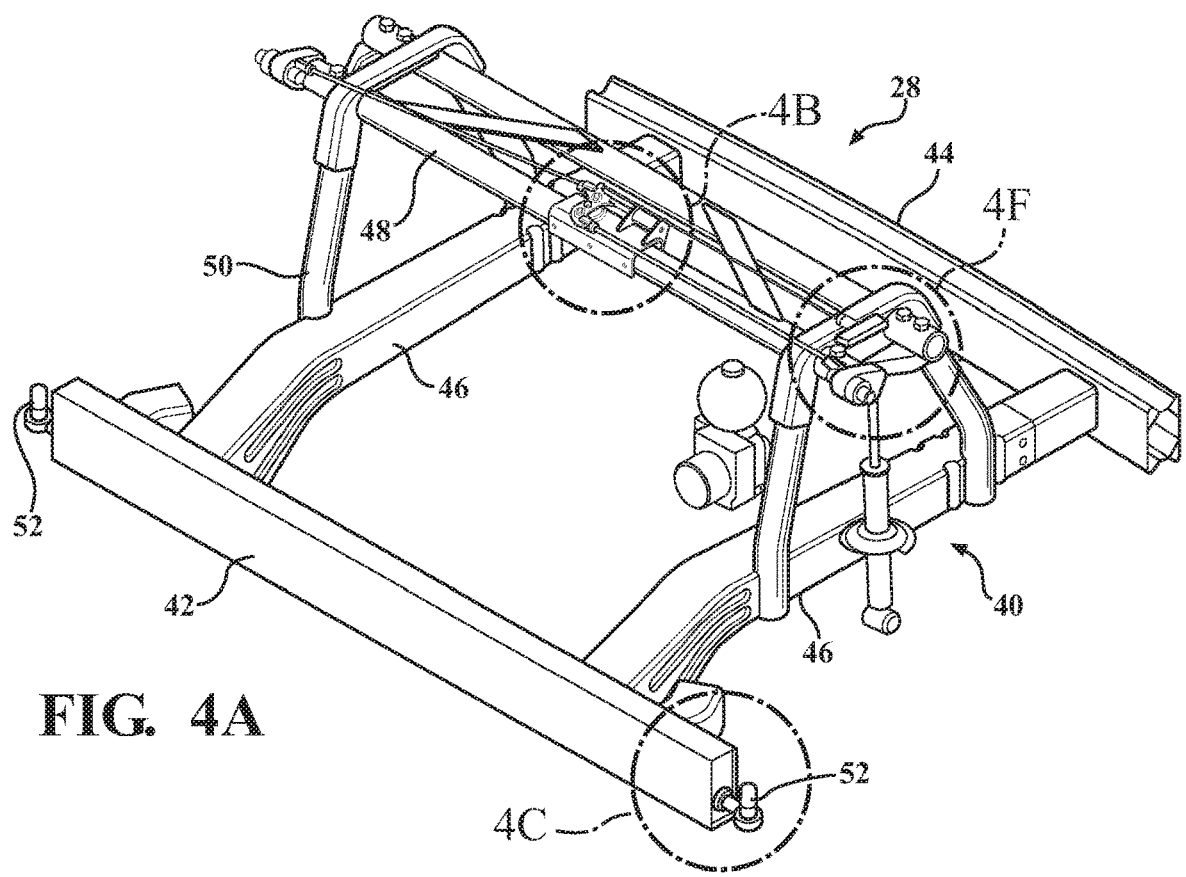
Figure 4B:
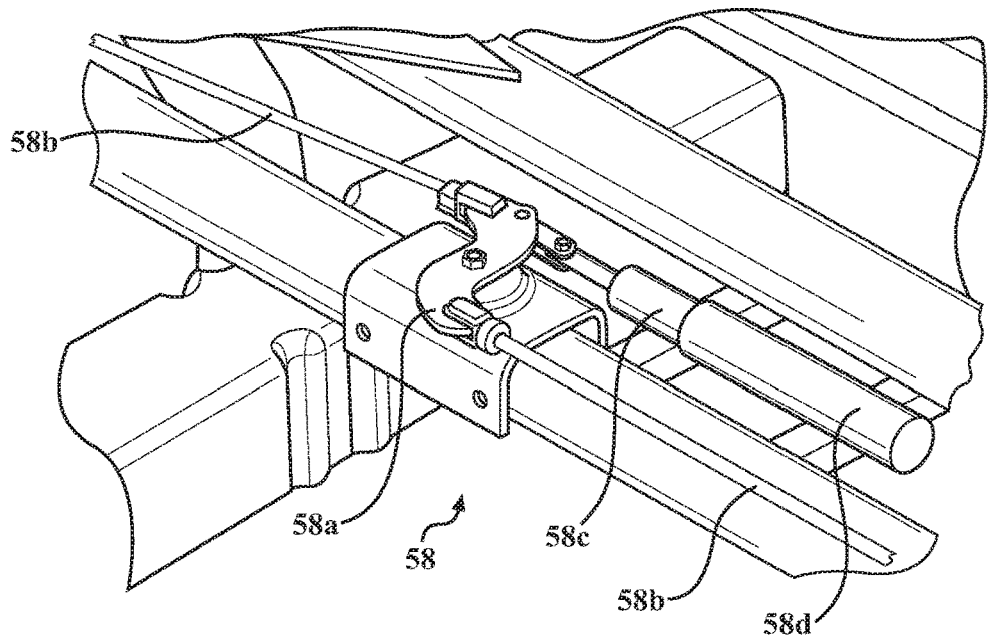
Figure 4F:
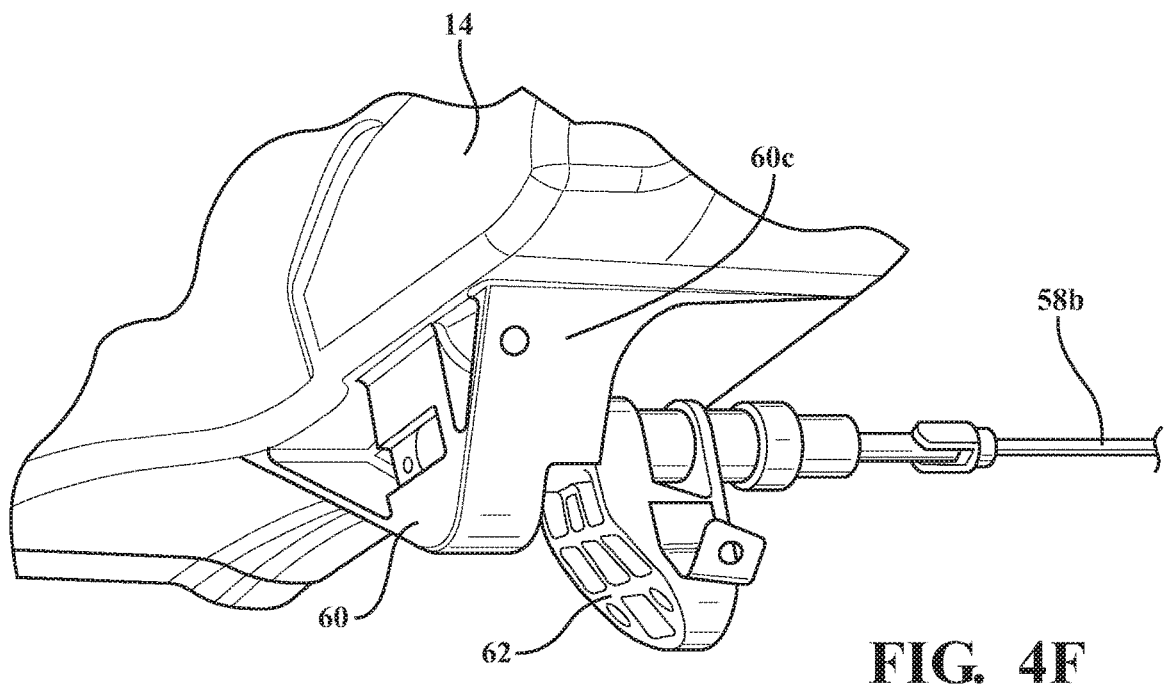
Figure 4G:
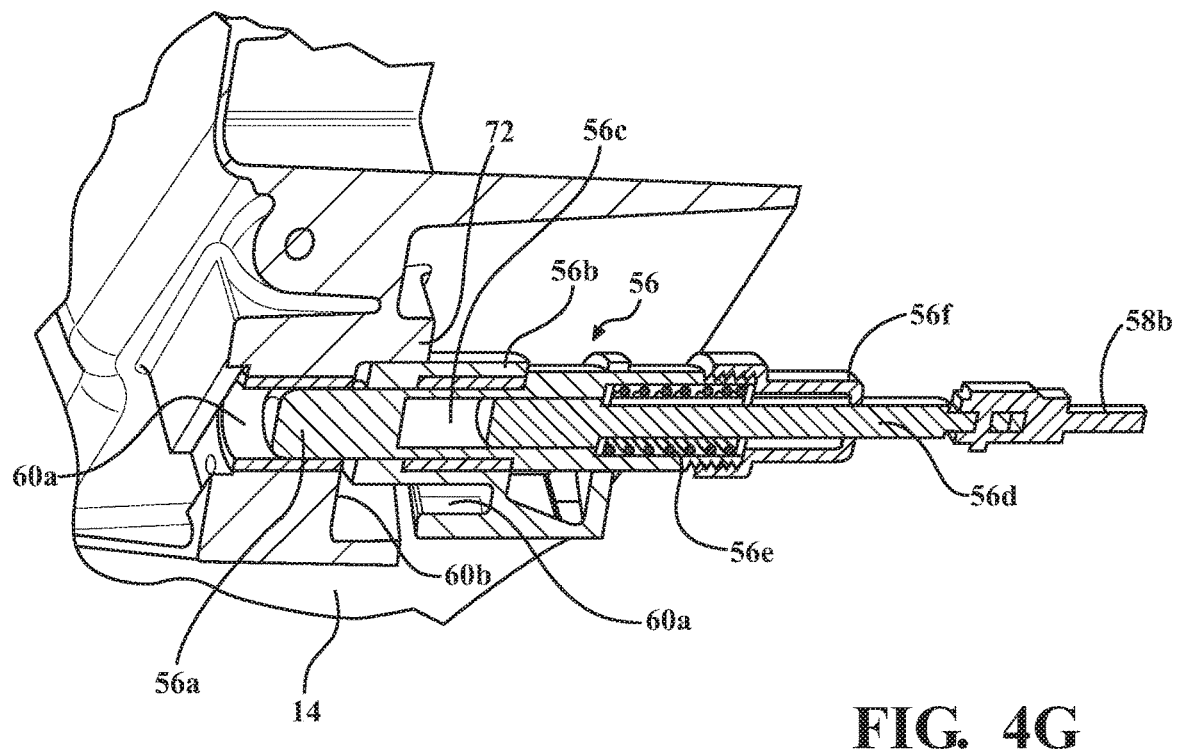

In each of the above described vehicle arrangements, the rear module 20 is detachable from the vehicle body 14, as shown in FIGS. 2 and 3. The rear module 20 may include support structure 28, shown in FIG. 4A, that can support the rear axle 18 and further components, which are further described below. The further components may change the range capability of the vehicle 12. The nominal rear module 20a may be removed and replaced by another type of rear module 20 that includes additional power components. One such type of rear module that may replace the nominal rear module 20a is a battery rear module 20b.

The battery rear module 20b may include similar physical structure, such as the support structure 28, that is similar to or the same as that of the nominal rear module 20a and other rear modules 20, such that the various rear modules 20 may be easily replaceable with a common vehicle body 14. The battery rear module 20b may include an additional battery 30 (FIG. 1) that may mounted to and supported by the support structure 28. The support structure 28 may support the rear axle 18 and other internal components. The support structure for the rear module 20 may vary depending on the specific components that are mounted and carried by the rear module 20. However, various interfaces of the rear module 20, for example the structural interfaces intended to mate with the vehicle body may be common for different modules 20 to enable ease of replacement.

The battery rear module 20b includes various wire harness components that are connected to the additional battery 30 and connectable to an electrical interface that is operatively connected to the PSM e-motor of the vehicle 12 or to the standard battery 22 of the vehicle. Thus, when the battery rear module 20b is connected to and attached to the vehicle body 14, the overall charging capacity and power capability of the vehicle 12 is increased relative to the nominal rear module 20a. The vehicle 12 may therefore have a greater range relative to vehicles that include the nominal rear module 20a or other vehicles that have a similar standard battery.

In another approach, the rear module 20 may be in the form of range extension module 20c. The range extension module 20c may include an internal combustion engine 32 (FIG. 1) mounted to the support structure 28. The engine 32 may be capable of operating as a generator to charge the main battery of the vehicle for providing range extension when needed. The engine 32 may be similar to a traditional combustion engine that is powered by gasoline or other fuel.

When the extension module 20c is attached to the vehicle 12, the vehicle 12 will have extended range based on the ability of the engine 32 to charge the battery 22 operating the front axle 16 when it has drained.

It will be appreciated that other arrangements of range extending components could be implemented into the rear module 20. For example, different battery sizes could be included in the rear module 20, providing for a wide range of additional vehicle range based on the size of the battery. Alternatively, both a battery for providing additional power to the e-motor and an engine for driving the rear axle could be included.

Accordingly, it will be appreciated that the types of replacement rear modules 20 that can be used are not limited to those described above, and that other supplemental components other than batteries or engines may be provided in the rear module 20.

The rear module 20 may include various structure to make the rear module 20 an integral part of the overall vehicle and allow the rear module 20 to be easily swapped with other types of rear modules. For example, the rear module 20 may include attached wheels, or wheel support structure allowing for installation of wheels at a later time. The rear module 20 may include the rear bumper and other exterior rear body components. The rear module 20 may further include storage compartments, such as a trunk or the like, or other structure such as bike racks, trailer hitches, or the like. The rear module 20 may include various types of aesthetic features enabling the user to tailor the appearance of the vehicle.

The rear module 20 may be easily attached and detached from the remaining vehicle structure while maintaining the structural integrity of the vehicle 12 such that the vehicle 12 will satisfy various safety standards, such as collision resistance. The rear module 20 itself may include a structural layout that is also impact resistant and satisfies safety standards.

With reference to FIGS. 4A-4G, the rear module 20 may include various support structure including a support frame 40. The frame 40 may include a front cross bar 42 and a rear cross bar 44. The rear bar 44 may operate as the rear bumper of the vehicle 12. A pair of fore-and-aft linkage bars 46 extend generally longitudinally between the front and rear bars 42 and 44. An upper cross frame 48 extends laterally across the rear module 20, and is supported by strut members 50 extending upwardly from the linkage bars 46.

The rear module 20 may be detachably connected to corresponding structure disposed on the vehicle body 14. The rear module 20 may include a pair of ball joint linkage with vertical post 52 that extend laterally outward from opposite lateral ends of the front bar 42. The posts 52 may have a generally circular cross-section. The posts 52 include lateral portions 52a that extend laterally into the front bar 42 and provide resistance to loads in the fore-and-aft direction and the up-and-down direction. The posts 52 also include vertical portions 52b that bend upward from the lateral portions 52.

In one aspect, the vertical portions 52b are connected to the lateral portions 52a in a ball and socket arrangement. In this aspect, the vertical portions 52b may include a ball shaped end at a bottom end thereof, which is received in a socket shaped end of the lateral portions 52a. Accordingly, the vertical portions 52b may pivot relative to the lateral portions 52a. In one aspect, the vertical portion may pivot +/−26 degrees relative to vertical to define a cone-shaped area of travel within which the vertical portion 52b may be aligned, thereby assisting in the receipt of the vertical portion 52b within the vehicle structure.

The vertical portions 52b are configured to be received in a block member 54 that is coupled to the vehicle body 14. The block member 54 includes a vertical bore 54a that is sized and configured to receive the vertical portion 52b. The vertical portion 52b may therefore be inserted upwardly into the bore 54a, or the block member 54 and bore 54a may be raised off the vertical portion 52b or lowered onto the vertical portion 52b. When the posts 52 are engaged with the block members 54, the rear module 20 is attached to the vehicle body 14 at these two locations. The block member 54 may include a ball-switch disposed within the bore to indicate receipt of the vertical portion 52b within the block member 54.

The rear module 20 is further attached to the vehicle body 14 at opposite lateral locations at the upper cross frame 48. The cross frame 48 may include a moveable pin assembly 56, including a pin 56a, which may include a collar portion 56b surrounding the pin 56a. An inner end of the pin 56a may be coupled to an actuation mechanism 58, which may move the pin assembly 56 laterally inward and outward relative to the vehicle body 14 and between engaged and disengaged positions relative to the vehicle body 14. As described in further detail below, the pin 56a may be moveable relative to the collar portion 56b in axial direction of the pin (lateral direction of the vehicle).

The pin 56a may include a cavity 56c defined along an axis of the pin 56a. The cavity 56c may include a pull rod 56d disposed therein. The cavity 56c may further include a spring member 56e disposed laterally inward from an outer end of the pull rod 56d. The pin 56a may further include an inner end cap 56f. The pull rod 56d is moveable axially relative to the pin 56a, with the spring member 56e biasing the pull rod 56d and pin 56a to the position shown in FIG. 4G.

The vehicle body 14 may include an upper bracket 60 that is sized and configured to receive the pin assembly 56. The upper bracket 60 may therefore include a bore 60a that is sized to receive the cylindrical shape of the pin 56a. The upper bracket 60 may also include mating surface 60b that is configured to abut the collar portion 56b when the pin 56a is received in the bore 60a.

When the pin 56a is engaged with the upper bracket 60, the support frame 40 of the rear module 20 is held in place in the fore and aft and up and down directions. The pin assembly 56 may be housed within a casing 62 (which may include the collar portion 56b), where the pin 56a is moveable in the lateral direction relative to the casing 62. The casing 62 may be generally fixed relative to the remainder of the support frame 40. The casing 62 may be disposed against a laterally facing surface 60c of the upper bracket 60, thereby retaining the rear module 20 in the lateral direction.

Thus, when the pin assembly 56 is in the engaged position with the upper bracket 40, and the posts 52 are engaged with the blocks 54, the rear module 20 is retained relative to the vehicle body 14. The pin assembly 56 may restrict relative movement of the rear module in the fore-and-aft direction as well as the up-and-down direction. The posts 52 may restrict fore-and-aft movement as well as lateral movement. The pin assembly 56 extends in a generally lateral direction, and the posts extend 52 in a generally vertical direction.

The pin assembly 56 may be disengaged from the upper bracket 60 either manually or by automation. The actuation mechanism 58 may be attached to a central portion of the upper cross frame 48. The actuation mechanism 58 may include a brain plate mechanism 58a that is pivotable. A pair of rods 58b may extend laterally outward from the brain plate mechanism 58a, with the rods 58b being attached to the inner ends of the pull rods 56d. An actuator 58c, which may be in the form of a rotation/translation mechanism or a linear actuator, is coupled to the brain plate mechanism 58a, and may pivot the brain plate mechanism 58a in response to actuation.

Pivoting the brain plate mechanism 58a will cause the rods 58b to be pulled inward and to pull the pull rod 56d. In some cases, friction between the pin 56a and the bracket 60 may cause the pull rod 56d to move axially relative to the pin 56a, thereby compressing the spring member 56e. Friction may be caused by the load of the vehicle bearing on the pin 56a. When the friction is reduced, such as by raising the vehicle or otherwise reducing the load on the pin 56a, the compression force of the spring 56a may then cause the pin 56a to spring laterally inward as the spring 56e expands and the pull rod 56d remains in a pulled position.

In response to the pin 56a shifting laterally inward, the pin 56a will be out of engagement with the upper bracket 60, releasing the corresponding attachment at the vehicle body 14. Pivoting the brain plate mechanism 58a is in the opposite direction will move the pull rods 56d and pins 56a laterally outward and into engagement with the bracket 60, thereby reattaching the rear module 20 at the corresponding attachment points.

The pins 56a may be inserted relative to the brackets 60 on each side of the vehicle in an independent manner. For example, when engaged with the bracket 60, the pin 56a on one side of the vehicle may be pushed inward. In such a case, the pin 56a may move relative to the collar 56b and the pull rod 56d, causing the spring 56e to compress. In such a case, the pin 56a may no longer be engaged with the bracket 60. However, such movement will not be transmitted via the pull rod 56d. Similarly, when the brain plate mechanism 58a is actuated to insert each of the pins 52a into the corresponding brackets 60, one pin 56a may insert, while another may be temporarily blocked over hindered by frictional forces. Such an impediment will not stop the brain plate mechanism 58a from moving in this manner. Rather, the spring 56e at the side of the impediment will compress. Once the pin 56a is properly aligned or friction is overcome, the spring 56e will force the pin 52a outward relative to the pull rod 56d and into engagement within the bracket 60.

The actuation mechanism 58 may also include a cable mechanism (not shown), which may provide manual actuation of the actuator mechanism 58. The cable mechanism may be pulled, which will pivot the brain plate mechanism 58a as described above. The brain plate mechanism 58a may be manually actuated in other methods, as well. The brain plate mechanism 58a may include a biasing member that biases the brain plate mechanism 58a to a nominal position where the pins 56a are in the engaged position. The cable mechanism 58d may include a locking mechanism that allows the cable mechanism 58d to be held in place and overcome the bias to allow for the rear module 20 to remain disengaged during installation or removal of the rear module 20.

Alternatively, the actuation mechanism 58 may be electrically operated without the use of cables that mechanically pull the pins 56a. For example, the pins 56a may be actuated by a solenoid mechanism or a magnetically driven mechanism to move the pins 56a between engaged and disengaged positions. Other mechanisms for moving the pins 56a may also be used. For example, an electric motor may directly rotate the brain plate mechanism 58a.

The above described system 10 allows for quick and simple swapping of rear module types to suit the needs of the vehicle operator, without compromising structural integrity and crash performance. The swapping of modules 20 may be achieved in a matter of minutes, similar to the amount of time required for re-fueling a traditional vehicle. The swapping of rear modules 20 can be performed without the use of special tools. The swapping of the rear modules 20 allows for easy conversion of a simple BEV to an extended range BEV or a plug-in hybrid electric vehicle that utilizes a combustion engine for the rear axle 18. Onboard vehicle control architecture may be utilized to operate the vehicle 12 depending on the type of rear module 20 that is attached. The rear module 20 may be attached without requiring a substantial number of additional connections to be made between the vehicle body 14 and the rear module 20. Rather, only electrical connections may be needed, and the electrical connections can be collected into a single multi-pin connector or other communication and current transferring connection type. The electrical connection may be performed manually or through the use of an actuator.

Figure 10:
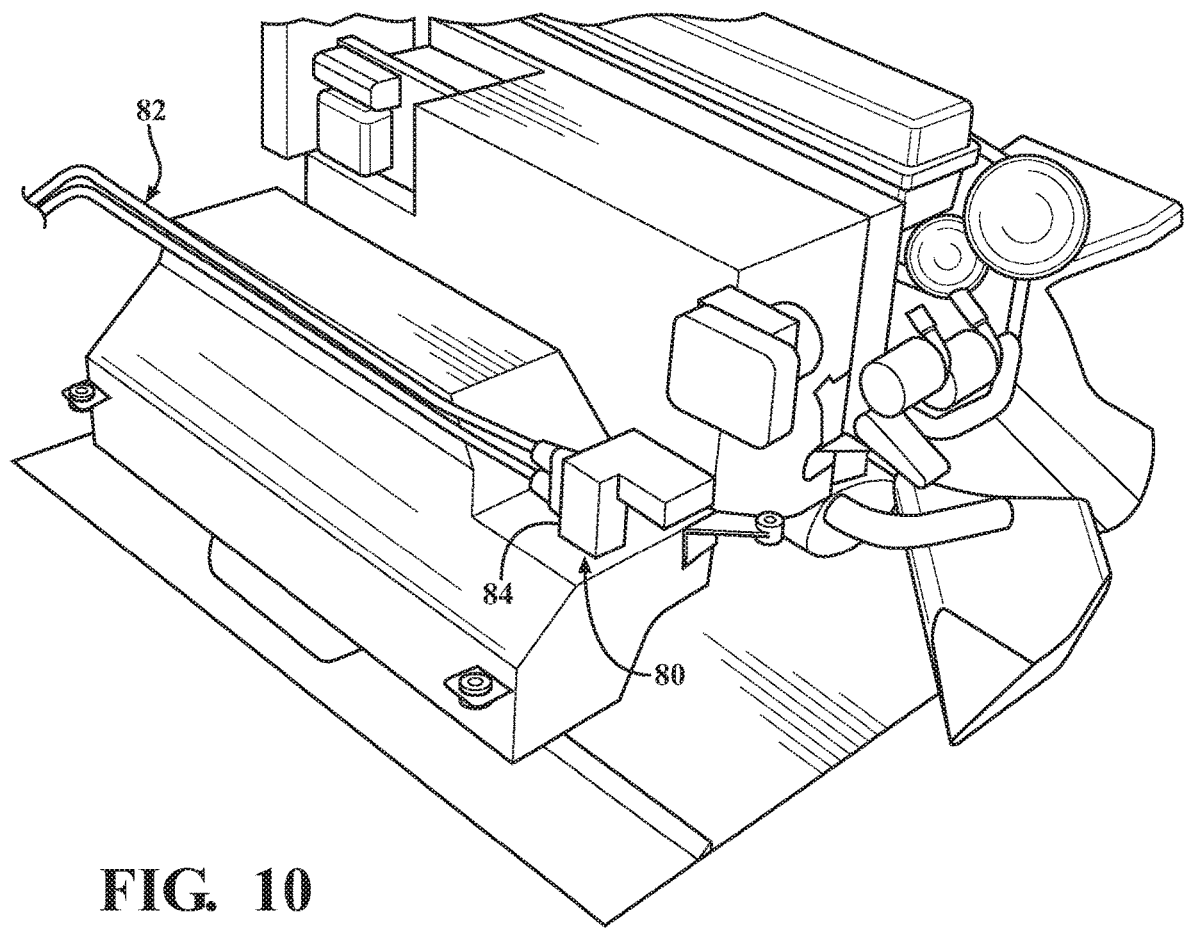
FIG. 10 illustrates an electrical connector of the system.
Figure 11:
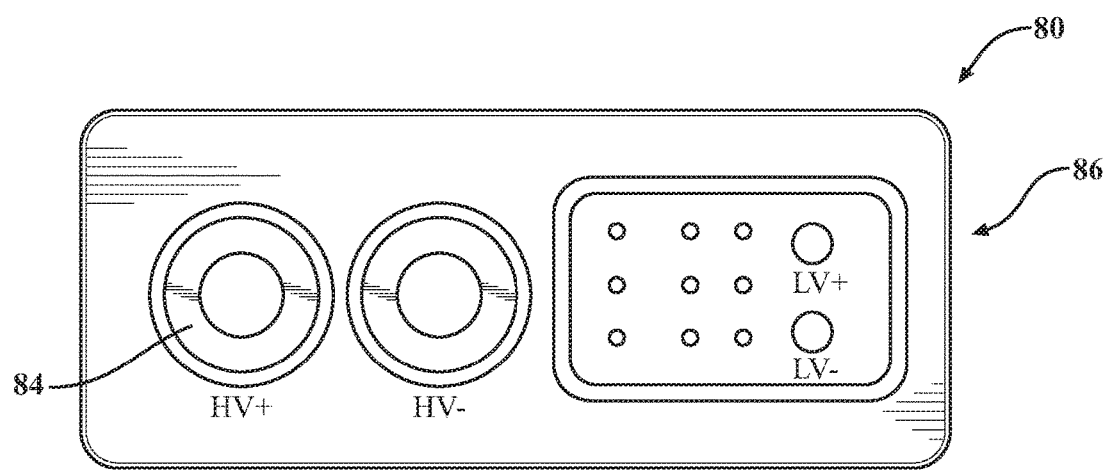
FIG. 11 illustrates a connector housing of the electrical connector and connections within the housing.
Figure 12:
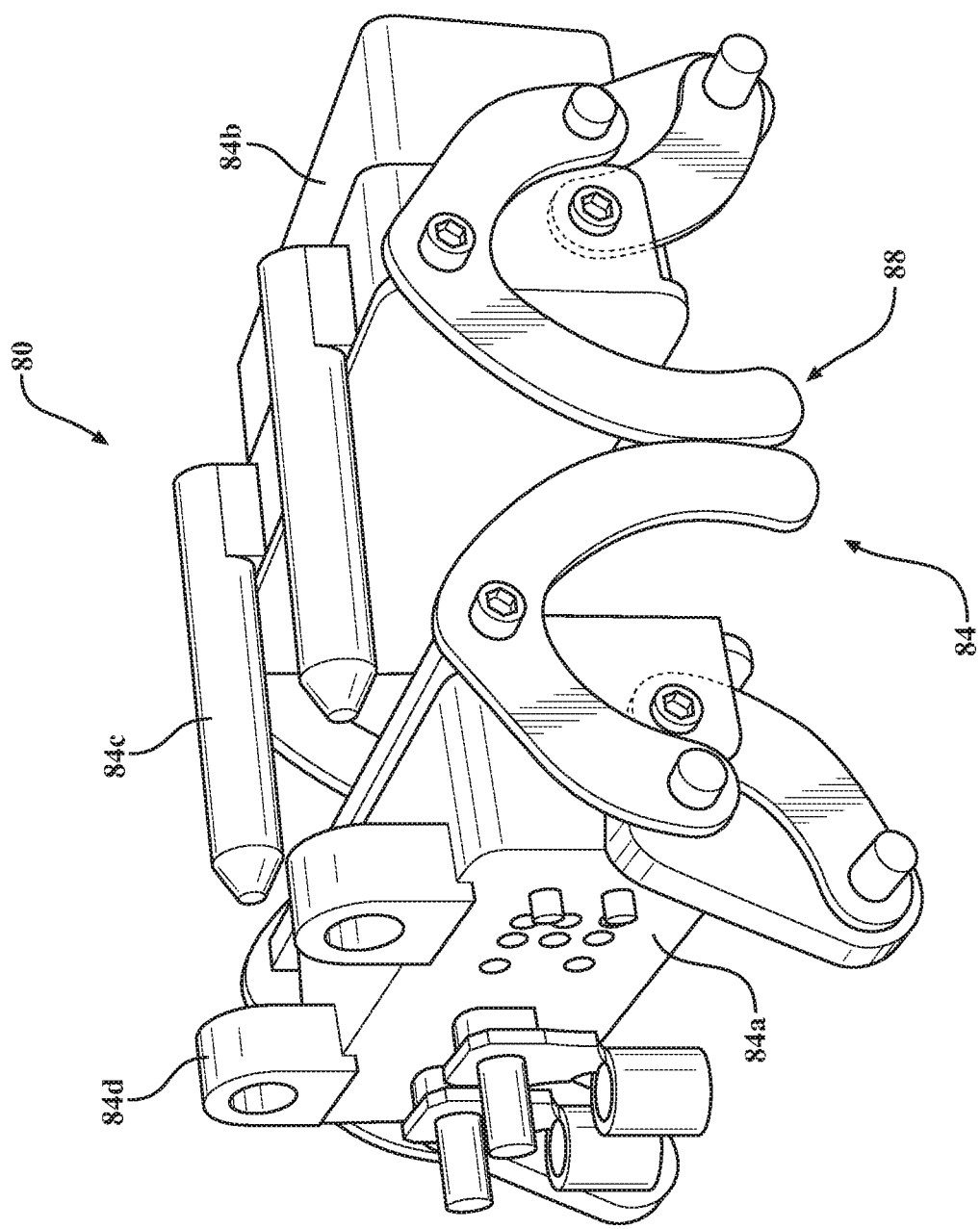
FIG. 12 illustrates two halves of the connector housing that may be brought together to electrically connect the vehicle body and the rear module.

FIGS. 10-12 illustrate one example of an electrical connector 80. FIG. 10 illustrates a pair of electrical cables 82 that extend to a connector housing 84, in which various connections 86 are disposed. For example, as shown in FIG. 11, the housing 84 may include high voltage (HV) and low voltage (LV) connections, high voltage interlock loop (HVIL) connections, ground connections (GRD), and ignition connections (IGN). Other electrical connections may also be made. The connector housing 84 may include two halves 84a and 84b, with connectors in both halves that may be made or broken depending on whether the halves are connected to each other.

FIG. 12 illustrates the two halves 84a and 84 that make up the overall housing 84 of the electrical connector 80. The halves 84a and 84b are shown in a disconnected state. The halves 84a and 84b may include corresponding mechanical structure that may be coupled together to make the connection. For example, a pair of rods 84c may be received within a corresponding pair of holes 84d.

One of the halves 84a, 84b may be actuated toward the other. In one approach, the rear module side of the connector 80 may be actuated to engage and disengage with opposite half of the connector 80. In one approach, as shown in FIG. 12, the halves 84a, 84b may include an engagement mechanism 88 that converts actuation of one of the halves 84a, 84b into movement of the other. Of course, other engagement mechanisms could also be used.

In another approach, one of the halves 84a, 84b may remain in a stationary position, and the other of the halves 84a, 84b may be moved linearly into engagement with the stationary half. For example, a linear actuator (not shown) such as a solenoid actuator or similar may be used to actuate one of the halves 84a, 84b (for example the rear half) into engagement with the other half (for example the front half). The actuation may be independently controllable relative to the mechanical connections made between the vehicle body 14 and the rear module 20, or the actuation may be tied to the mechanical connection actuation, such that a signal or actuation to de-couple the rear module 20 from vehicle body 14 will cause the electrical connection 80 to be opened prior to disengaging the mechanical connections, and similarly, when the mechanical connection is to be made again, the actuation to make the electrical connection 80 may be automatically performed after making the mechanical connection. The direction of actuation for the electrical connection 80 may be made in the for-and-aft direction, or it may be made in a lateral or vertical direction, or another direction, depending on the layouts of the vehicle body 14 and the rear module 20.

It will be appreciated that other types of connector housings and engagement mechanisms may be used. The electrical connection 80 may be the only communication-type connection made between the vehicle body 14 and rear module 20. Put another way, there may be no hydraulic or other fluid connections made between the vehicle body 14 and the rear module 20, and there may be no other cable connections made between the vehicle body 14 and the rear module 20. It will be appreciated that the reference to no cable connections does not refer to the electrical cables that extend to the electrical connector 80. The connector 80 makes multiple electrical connections, which may include cables on each side, but individual cable connections between the vehicle body 14 and rear module 20 may be excluded, such that the only connection that needs to be made is the connection made at the electrical connection 80. By using a single electrical connection 80 (which may include multiple types of connections therein), the removal and replacement of the rear module 20 may be accomplished quickly and with a reduced number of connections and human interaction.

With reference to FIGS. 5-9, to perform the rear module 20 swapping, the vehicle 12 may be provided with an integral jack mechanism 70 that is attached to the vehicle body 14. The jack mechanism 70 may be manually or automatically actuated in a manner known in the art. The jack mechanism 70 may be disposed near the rear end of the vehicle body and adjacent the rear module 20. The jack mechanism 70 may be disposed on each lateral side of the vehicle body 14, or may be disposed at a generally laterally central location of the vehicle body 14.

Figure 5:
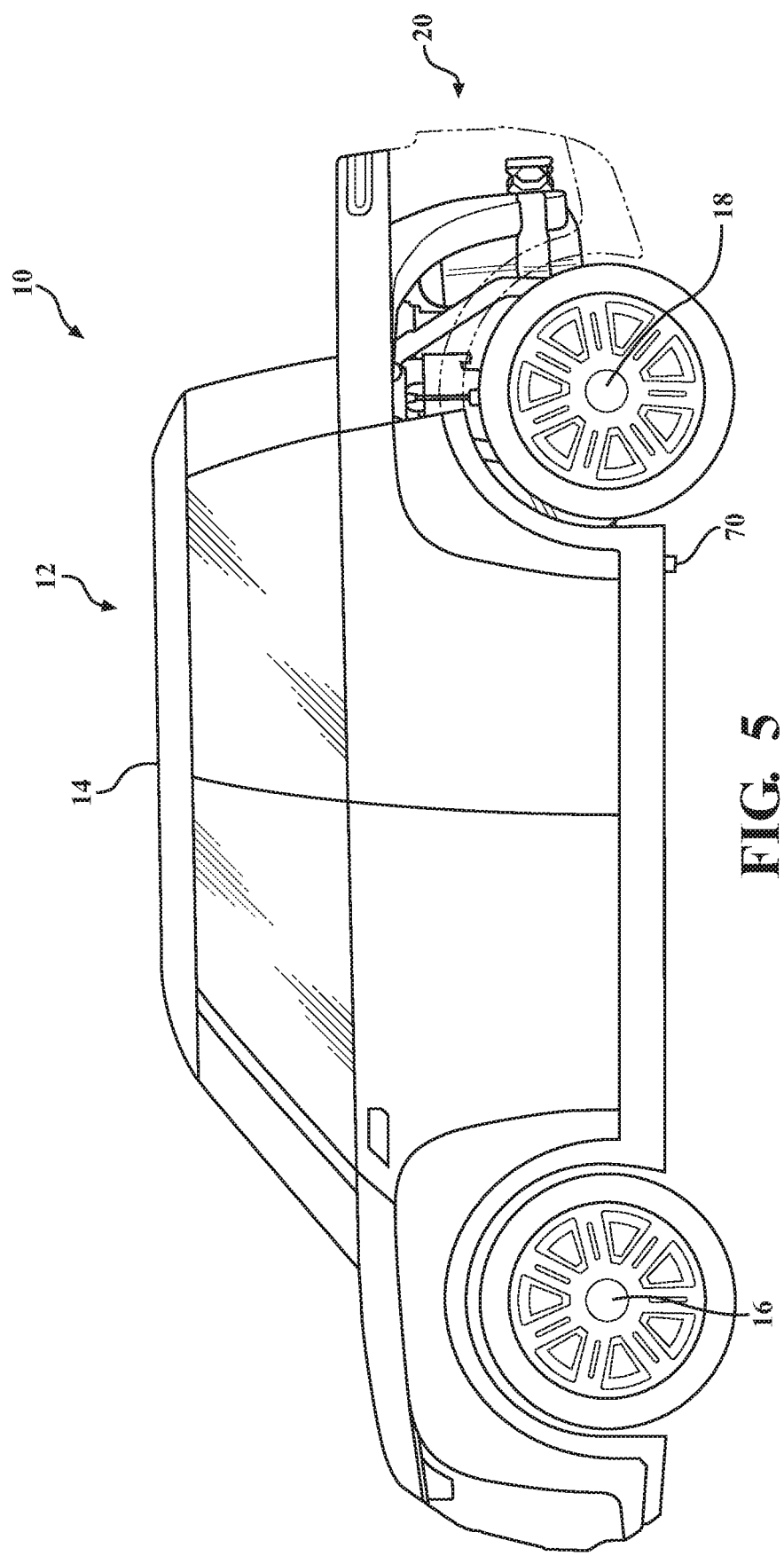
FIG. 5 illustrates the vehicle body with the rear module attached.
Figure 6:
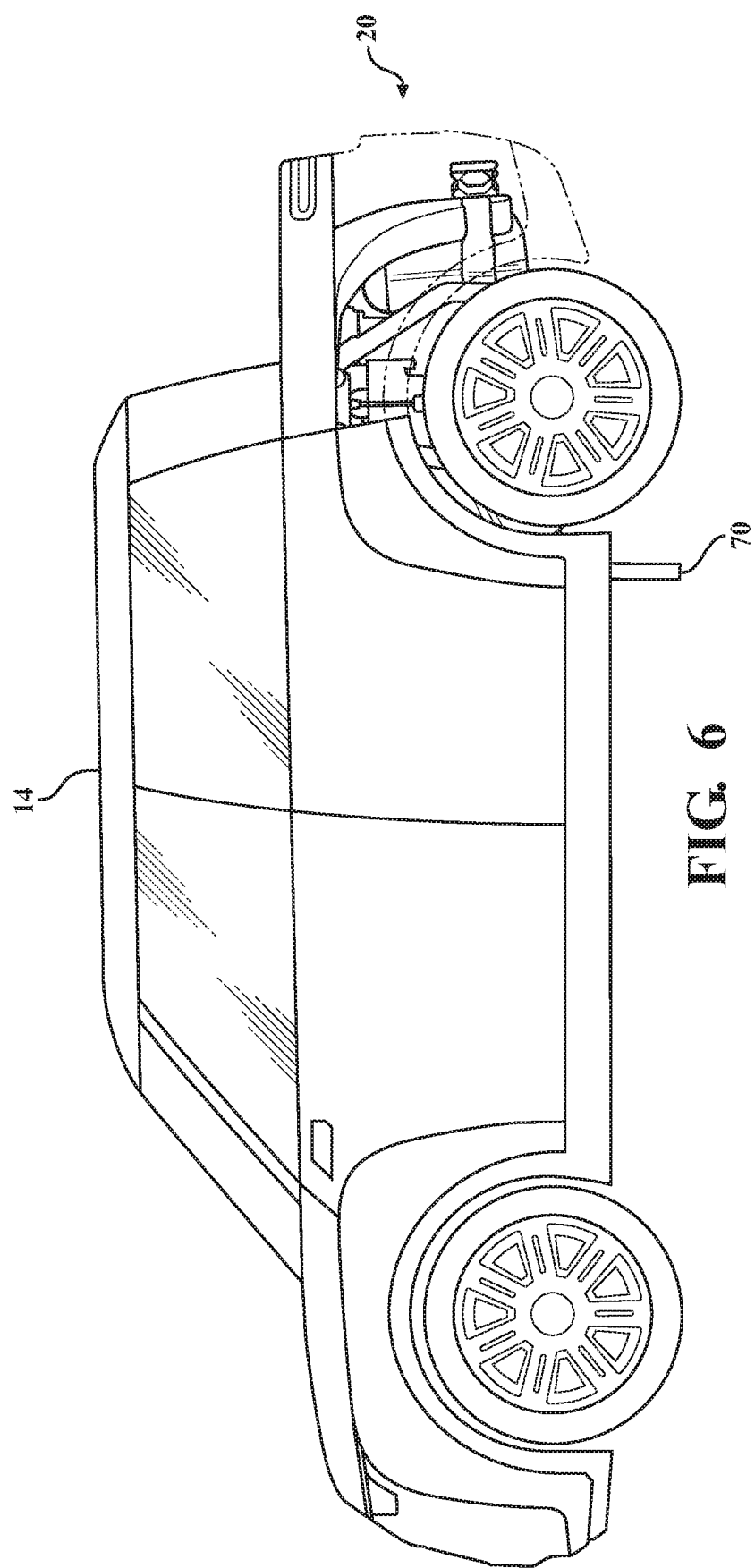
FIG. 6 illustrates the vehicle body with a jack mechanism extending to the ground.

The jack mechanism 70 may have a retracted state, shown in FIG. 5, in which the bottom end of the jack mechanism 70 is disposed near the bottom edge of the vehicle body 14. The jack mechanism 70 may be extended downward, where the bottom end of the jack mechanism 70 will contact the ground, as shown in FIG. 6, such that the vehicle body 14 is supported in a vertical direction by the jack mechanism 70.

After extending the jack mechanism 70, the actuation mechanism 58 of the rear module 20 may be actuated. In response to actuating the actuation mechanism 58, the pins 56a are retracted inward, and the connection between the pin assembly 56 and the vehicle body 14 may be disengaged. The vehicle body 14 may remain supported in the downward direction by the jack mechanism 70. Before or after the pins 56a are retracted inward, the electrical connection 80 may be disengaged. The electrical connection 80 may be disengaged prior to moving the rear module 20 relative to the vehicle body 14, and therefore before the vehicle body 14 is lifted off the rear module 20.

In this state, the vehicle body 14 may then be moveable in an upward direction away from the rear module 20 to separate the blocks 54 that are fixed to the vehicle body 14 from the posts 52 of the rear module 20 by sliding the blocks 54 off the posts 52, as further described below.

Figure 7:
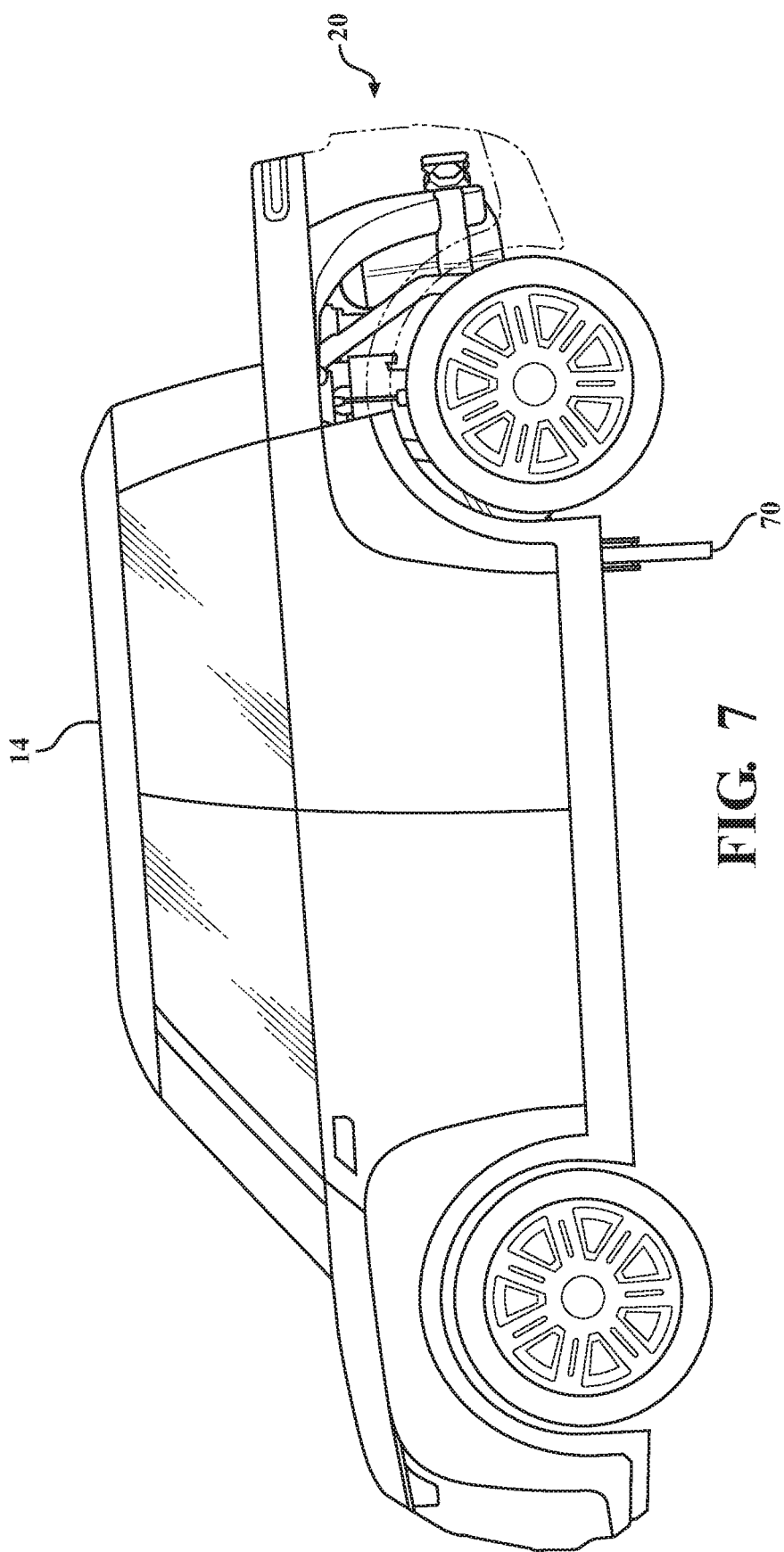
FIG. 7 illustrates the jack mechanism extended further and the vehicle body raised relative to the rear module.

Following initial contact with the ground and disconnecting the pins 56a and the electrical connection 80, the jack mechanism 70 may be extended further, which raises the rear end of the vehicle body 14, as shown in FIG. 7. As the vehicle body 14 is raised, the blocks 54 are raised relative to the posts 52 of the rear module. The rear module 20 therefore remains on the ground as the vehicle body 14 is raised. The upper bracket 60 of the vehicle body 14 moves away from the casing 62 and the retracted pins 56a.

Figure 8:
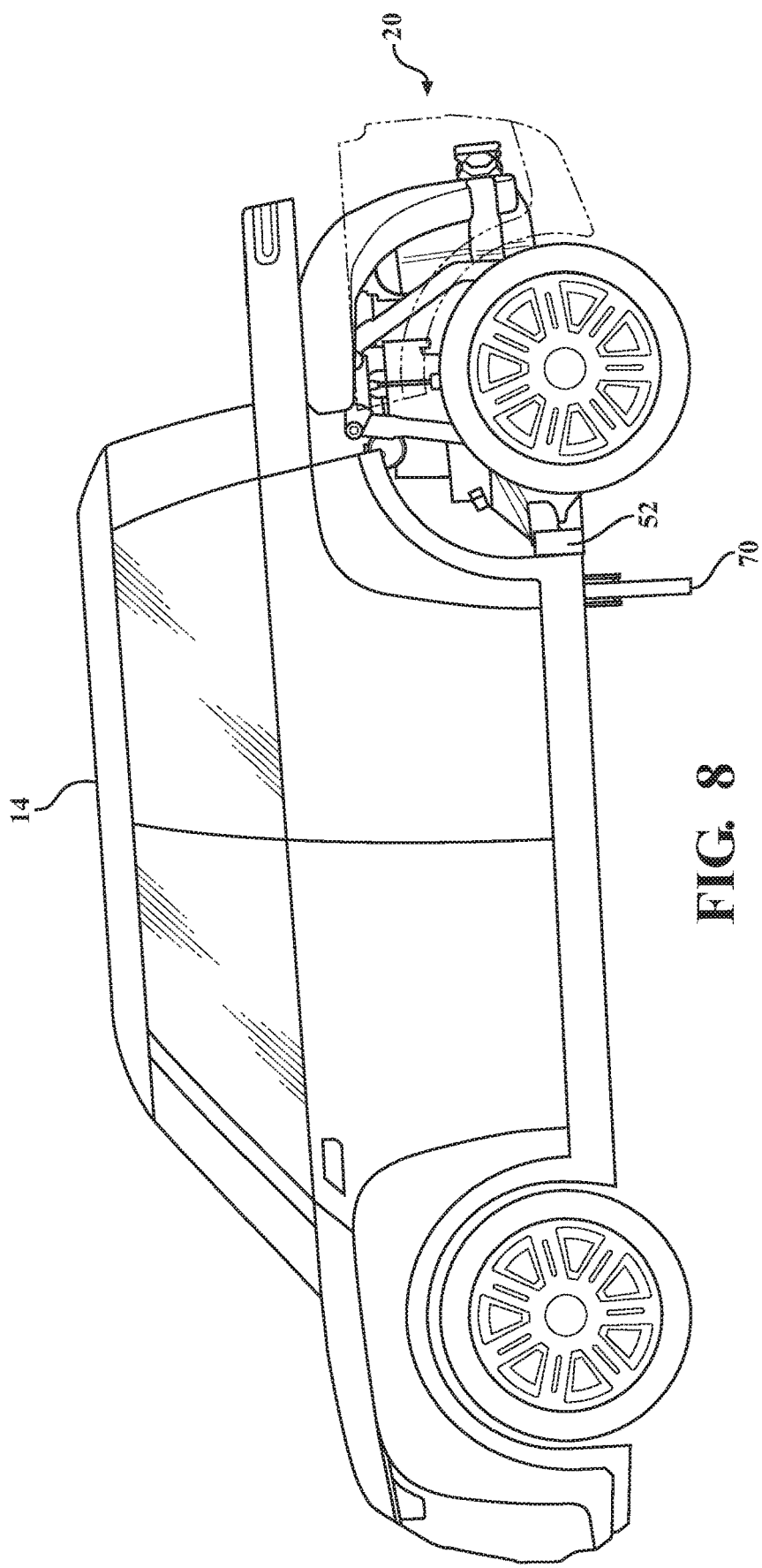
FIG. 8 illustrates the rear module detached from the vehicle body and moved rearward relative to the vehicle body.
Figure 9:
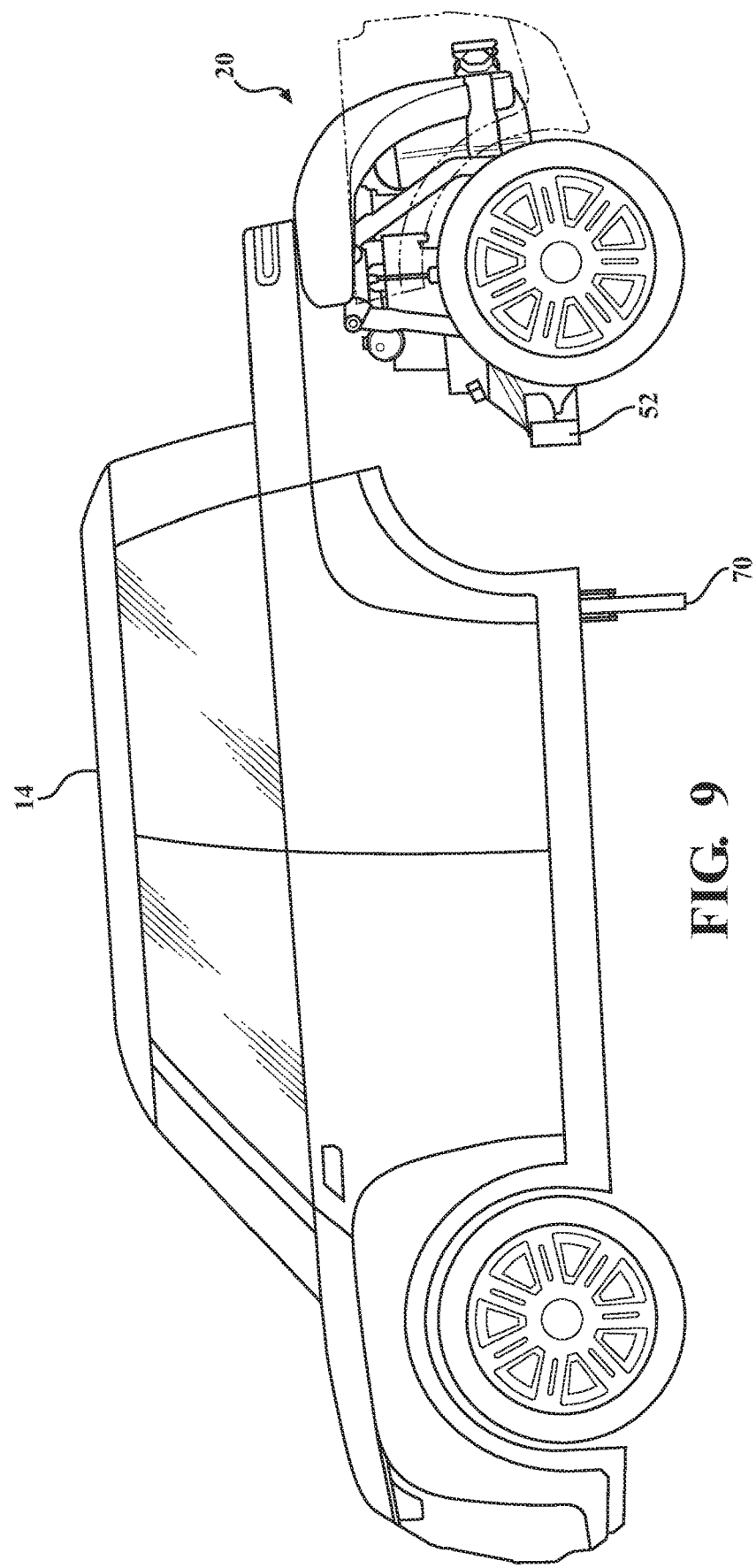
FIG. 9 illustrates the rear module moved further rearward relative to the vehicle body.

After the vehicle body 14 has been raised a sufficient distance, the rear module 20 is disengaged at all four attachment points that were described above. The rear module 20 may then be rolled away using the rear wheels of the vehicle, as shown in FIGS. 8 and 9.

Another rear module 20 may be rolled into the position vacated by the previous rear module 20 and into a position corresponding to FIG. 7. The posts 52 of the further module 20 may be inserted into the block member 54 by tilting the module 20 to raise the posts 52. The jack mechanism 70 may then be actuated to lower the vehicle body 14 onto the rear module 20, such as in the position shown in FIG. 6. The actuation mechanism of the rear module 20 may be actuated to move the pins 56a laterally outward and into engagement with the upper bracket 60, and the electrical connection 80 may also be actuated and connected once the rear module 20 is in place relative to the vehicle body 14. The jack mechanism 70 may be further retracted upward into a stowed position, as shown in FIG. 5. The rear module 20 may also be electrically coupled to the vehicle body 14 via the electrical connection 80 after the jack mechanism 80 has been fully retracted.

Thus, the swapping of the rear module 20 can be performed quickly, and the vehicle 12 may have additional range capabilities and operational abilities relative to the previously attached rear module 20.

The above connection and disconnection of the rear module 20 relative to the vehicle body 14 can be performed quickly because the connections between the rear module 20 and the vehicle body 14 can be limited. For example, the connections may include the mechanical connections described above that can be actuated to physically connect and disconnect the rear module 20 on demand. The connections may also include the electrical connection 80 between the rear module 20 and further electrical components housed in the vehicle body 14. As described above, in one approach, the only connections between the rear module 20 and the vehicle body 14 are the mechanical connections and the electrical connections described above. In this approach, there are no hydraulic or other fluid connections or cables. The electrical connections can be made using as little as one connection (the electrical connector 80) that can be quickly connected and disconnected, with the connector 80 including the multiple pins or other distinct connections that can be quickly coupled and decoupled to corresponding connections that can transfer power between systems and/or communicate with vehicle control units.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A system for modifying the range capabilities of an electric vehicle, the system comprising:
   a vehicle body having a vehicle structure and a first axle, wherein the first axle is one of a front axle or a rear axle, the vehicle body defining a fore-and-aft direction, and a lateral direction, wherein the front and rear axle each extend in the lateral direction;
   a first removable module having a second axle, wherein the second axle is the other of the front axle or the rear axle, the first removable module detachably coupled to the vehicle structure, wherein the first removable module and the vehicle structure are attached at a plurality of attachment points;
   an electrical connector disposed at an interface between the vehicle body and the first removable module for electrically connecting the vehicle body to the first removable module;
   wherein the first removable module is removable from the vehicle structure when the first removable module is disengaged from the vehicle structure at the attachment points and the electrical connector is disengaged; and
   wherein the first removable module is replaceable with a second removable module having range extending systems that differ from the first removable module;
   wherein the plurality of attachment points include:
      at least one vertically aligned post received within a vertically aligned bore, and
      at least one laterally aligned pin received within a laterally aligned bore, wherein the laterally aligned pin and laterally aligned bore each extend axially in the lateral direction;
   wherein, with the removable module in a stationary fore-and-aft position, the vehicle body is moveable vertically upward relative to the first removable module and disengages the vertically aligned post from the vertically aligned bore when the laterally aligned pin is moved in the lateral direction out of the laterally aligned bore and disengaged from the laterally aligned bore.

2. The system of claim 1, wherein there are no hydraulic or other fluid connections between the vehicle body and the first removable module, and there are no cable connections between the vehicle body and the first removable module other than the electrical connector.

3. The system of claim 1, wherein the plurality of attachment points includes a pair of upper attachment points and a pair of lower attachment points configured to enable connection of second rear modules having a wide dimensional tolerance at the attachment points.

4. A system for modifying the range capabilities of an electric vehicle, the system comprising:
 a vehicle body having a vehicle structure and a first axle, wherein the first axle is one of a front axle or a rear axle;
 a first removable module having a second axle, wherein the second axle is the other of the front axle or the rear axle, the first removable module detachably coupled to the vehicle structure, wherein the first removable module and the vehicle structure are attached at a plurality of attachment points;
 an electrical connector disposed at an interface between the vehicle body and the first removable module for electrically connecting the vehicle body to the first removable module;
 wherein the first removable module is removable from the vehicle structure when the first removable module is disengaged from the vehicle structure at the attachment points and the electrical connector is disengaged; and
 wherein the first removable module is replaceable with a second removable module having range extending systems that differ from the first removable module;
 wherein the plurality of attachment points includes a pair of upper attachment points and a pair of lower attachment points configured to enable connection of second rear modules having a wide dimensional tolerance at the attachment points;
 wherein each of the lower attachment points is defined by a ball joint linkage with a vertical post of the first removable module received in a bore of a block member of the vehicle body.

5. The system of claim 4, wherein each of the upper attachment points is defined by a retractable pin of the first removable module received in a bore of a bracket of the vehicle body.

6. The system of claim 5, wherein the pin is moveable laterally inward and outward relative to a support frame of the first removable module between an engaged position in which the pin is received within the bracket and a disengaged position in which the pin is not received within the bracket.

7. The system of claim 6, wherein the pin is moveable via an actuation mechanism having a brain plate mechanism coupled to the pins, wherein rotation of the brain plate mechanism in a first direction moves the pins toward the disengaged position, and rotation of the brain plate mechanism in a second direction moves the pins toward the engaged position, wherein the pins are biased toward the engaged position, wherein movement of the pins toward the disengaged position includes compressing and loading a spring member and moving the pin upon de-compression of the spring when the brain plate is rotated.

8. The system of claim 6, wherein the pins retain the first removable module relative to the vehicle body at least in a fore-and-aft direction and a vertical direction, and the posts retain the first removable module relative to the vehicle body at least in a lateral direction and fore-and-aft direction.

9. The system of claim 8, wherein, when the pins are in the disengaged position, the vehicle body is moveable vertically relative to the first removable module to a disengaged state at each of the plurality of attachment points and the first removable module is moveable in the fore-and-aft direction away from the vehicle body.

10. The system of claim 9, wherein the vehicle body includes a jack mechanism configured to extend downward into engagement with a physical surface disposed below the vehicle body, wherein extension of the jack mechanism moves the vehicle body upward to disengage the vehicle body from the posts of the first removable module when the pins of the first removable module are disengaged.

11. The system of claim 1, wherein the second removable module includes a combustion engine configured to provide range extension capabilities relative to the first removable module.

12. The system of claim 1, wherein the second removable module includes a battery having a greater range capability than the first removable module.

13. A method for modifying a range capability of an electric vehicle, the method comprising the steps of:
 providing a vehicle body having a vehicle structure and a first axle extending in a lateral direction of the vehicle;
 providing a first removable module having a second axle extending in the lateral direction, wherein the first removable module is secured to the vehicle structure at a plurality of attachment points and detachable from the vehicle structure, wherein the plurality of attachment points includes laterally extending pins received in laterally extending bores and that are moveable in the lateral direction;
 providing an electrical connection between the vehicle structure and the removable module via an electrical connector;
 raising and detaching the first removable module from the vehicle structure at each of the attachment points while the first removable module remains in a stationary fore and aft position;
 disengaging the electrical connection between the vehicle structure and the first removable module;
 removing the first removable module from the vehicle structure; and
 replacing the first removable module with a second removable module, wherein the second removable module includes range extending components that differ from the first removable module.

14. The method of claim 13, wherein there are no hydraulic or other fluid connections between the vehicle body and the removable module, and there are no cable connections between the vehicle body and the removable module other than the electrical connector.

15. A method for modifying a range capability of an electric vehicle, the method comprising the steps of:
 providing a vehicle body having a vehicle structure and a first axle;
 providing a first removable module having a second axle, wherein the first removable module is secured to the vehicle structure at a plurality of attachment points and detachable from the vehicle structure;
 providing an electrical connection between the vehicle structure and the removable module via an electrical connector;

detaching the first removable module from the vehicle structure at each of the attachment points while the first removable module remains in a stationary fore and aft position;

disengaging the electrical connection between the vehicle structure and the first removable module;

disengaging a pair of pins from the vehicle structure, wherein the pins are coupled to the first removable module and extend laterally into a bore of a bracket of the vehicle structure in an engaged position and move laterally inward to a disengaged position;

disengaging a pair of ball joint linkages with vertical posts from the vehicle structure, wherein the ball joint linkages with vertical posts are coupled to the first removable module and extend vertically into a bore of a block member of the vehicle structure, wherein the ball joint linkages with vertical posts are disengaged by raising the vehicle structure relative to the removable module when the pins are disengaged;

removing the first removable module from the vehicle structure;

disposing the second removable module below the vehicle structure when the vehicle structure is raised;

lowering the vehicle structure onto the second removable module, wherein posts of the second removable module are received in the block member of the vehicle structure;

inserting a pair of pins of the second removable module into the bores of the bracket of the vehicle structure; and engaging the electrical connection between the vehicle structure and the second removable module; and replacing the first removable module with a second removable module, wherein the second removable module includes range extending components that differ from the first removable module.

16. The method of claim 13, further comprising disengaging a pair of ball joint linkages with vertical posts from the vehicle structure, wherein the ball joint linkages with vertical posts are coupled to the first removable module and extend vertically into a bore of a block member of the vehicle structure.

17. The method of claim 16, wherein the ball joint linkages with vertical posts are disengaged by raising the vehicle structure relative to the removable module when the laterally extending pins are disengaged from the laterally extending bores.

18. A system for modifying the range capabilities of an electric vehicle, the system comprising:

a vehicle body having a vehicle structure and a first axle, wherein the first axle is one of a front axle or a rear axle;

a first removable module electrically connectible to the vehicle structure and having a second axle, wherein the second axle is the other of the front axle or the rear axle, the first removable module detachably coupled to the vehicle structure, wherein the first removable module and the vehicle structure are attached at a plurality of attachment points;

wherein the first removable module is removable from the vehicle structure when the first removable module is disengaged from the vehicle structure at the attachment points; and wherein the first removable module is replaceable with a second removable module having range extending systems that differ from the first removable module;

wherein the plurality of attachment points enable connection of second rear modules having a wide dimensional tolerance at the attachment points, wherein at least one of the attachment points is defined by a ball joint linkage with a vertical post of the first removable module received in a bore of a block member of the vehicle body;

wherein the plurality of attachment points include upper attachment points and lower attachment points, wherein each of the lower attachment points is defined by a ball joint linkage with a vertical post of the first removable module received in a bore of a block member of the vehicle body.

19. The system of claim 18, wherein each of the upper attachment points is defined by a laterally retractable pin of the first removable module received in a laterally aligned bore of a bracket of the vehicle body.

* * * * *